(12) United States Patent
Rajcic-Spasojevic et al.

(10) Patent No.: US 7,404,375 B2
(45) Date of Patent: Jul. 29, 2008

(54) TREATMENT TO INCREASE EGG HATCHABILITY

(75) Inventors: Gorica Rajcic-Spasojevic, Willmar, MN (US); Radivoje Spasojevic, Willmar, MN (US)

(73) Assignee: Willmar Poultry Company, Inc., Willmar, MN (US)

( * ) Notice: Subject to any disclaimer, the term of this patent is extended or adjusted under 35 U.S.C. 154(b) by 0 days.

(21) Appl. No.: 10/865,186

(22) Filed: Jun. 10, 2004

(65) Prior Publication Data

US 2005/0028741 A1  Feb. 10, 2005

Related U.S. Application Data

(60) Provisional application No. 60/478,571, filed on Jun. 12, 2003.

(51) Int. Cl.
*A01K 45/00* (2006.01)
(52) U.S. Cl. ........................................ 119/6.8
(58) Field of Classification Search ............. 119/6.8, 119/6.6; 426/614
See application file for complete search history.

(56) References Cited

U.S. PATENT DOCUMENTS

| | | | | |
|---|---|---|---|---|
| 2,734,482 | A * | 2/1956 | Seltzer | 119/6.8 |
| 3,147,737 | A * | 9/1964 | Theillig | 119/322 |
| 4,604,968 | A | 8/1986 | Christensen | |
| 4,917,045 | A * | 4/1990 | Wiegand et al. | 119/6.6 |
| 5,158,038 | A * | 10/1992 | Sheeks et al. | 119/6.8 |
| 5,339,766 | A * | 8/1994 | Phelps et al. | 119/6.8 |
| 5,722,342 | A * | 3/1998 | Line et al. | 119/6.8 |
| 6,240,877 | B1 * | 6/2001 | Bounds | 119/6.8 |
| 6,718,909 | B2 * | 4/2004 | Moran | 119/6.8 |

OTHER PUBLICATIONS

Bagley and Christensen, "Hatchability, Hematological Indices, and Growth of Turkey Embryos Incubated at High Altitude with Supplemented Oxygen During the First and Fourth Weeks of Incubation," *Poult. Sci.*, Feb. 1991; 70(2):358-365 and Publication page.

Bagley and Christensen, "Physiology and Reproduction, Hatchability and Physiology of Turkey Embryos Incubated at Sea Level with Increased Eggshell Permeability," *Poult. Sci.*, Jun. 1991; 70(6):1412-1418, Title page, and Publication page.

Bagley, "Embryonic Respiration and Hatchability of Turkey Eggs," Ph.D. Thesis from North Carolina State University, Raleigh, 330 pgs. (1987).

Christensen et al., "Vital Gas Exchange and Hatchability of Turkey Eggs at High Altitude," *Poult. Sci.*, Jul. 1984; 63(7):1350-1356 and Publication page.

Deeming, "Effect of Cuticle Removal on the Water Vapour Conductance of Egg Shells of Several Species of Domestic Bird," *British Poultry. Sci.*, 1987, 28:231-237.

Peebles and Brake, "Education and Production, The Role of The Cuticle in Water Vapor Conductance by the Eggshell of Broiler Breeders," *Poult. Sci.*, 1986, 65:1034-1039 and Publication page.

Peebles et al., "Effects of Eggshell Cuticle Removal and Incubation Humidity on Embryonic Development and Hatchability of Broilers," *Poult. Sci.*, May 1987; 66(5):834-840.

Peebles et al., "Effects of Dietary Fat and Eggshell Cuticle Removal on Egg Water Loss and Embryo Growth in Broiler Hatching Eggs," Poult. Sci., Oct. 1998; 77(10):1522-30, Title page, and Publication page.

Wangensteen, "Respiratory Gas Exchange by the Avian Embryo," Respir. Physiol., 1970-71;11(1):31-45.

Wangensteen et al., "Diffusion of Gases Across the Shell of the Hen's Egg," *Respir. Physiol.*, 1970-71;11(1):16-30.

Wangensteen et al., "Gas Exchange by a Bird's Embryo," *Respir. Physiol.*, Mar. 1972;14(1):64-74.

Wilson, "Hatchability Problem Analysis," *University of Florida, Cooperative Extension Service, Institute of Food and Agricultural Sciences, Circular 1112*, pp. 1-11 (Oct. 1994).

* cited by examiner

*Primary Examiner*—Son T. Nguyen
(74) *Attorney, Agent, or Firm*—Mueting, Raasch and Gebhardt, P.A.

(57) ABSTRACT

The present invention provides methods for increasing the hatchability of eggs by contacting an avian egg with a solution that includes a halide, preferably chlorine.

15 Claims, No Drawings

TREATMENT TO INCREASE EGG HATCHABILITY

RELATED APPLICATIONS

This application claims the benefit of U.S. Provisional Application No. 60/478,571, filed Jun. 12, 2003, which is incorporated by reference in its entirety.

BACKGROUND

The poultry industry hatches more than 9.1 billion birds each year in the United States. The intense genetic selection of turkeys, chickens and other poultry for increased body size and growth rates has achieved dramatic results. However, this genetic selection has adversely affected the efficiency of poultry production by causing low average hatchability rates for the eggs, as low as about 70% for many strains of domestic turkeys (Christensen, U.S. Pat. No. 4,604,968). Since the intense genetic selection of poultry continues today, and will continue for the foreseeable future, it is possible that hatchability rates will continue to decrease. Efforts to increase the hatchability of poultry eggs have included optimizing the environmental conditions during egg incubation, and the injection of antibiotics into eggs to control disease.

The ability of a developing embryo to breath during the incubation process occurs solely by the diffusion of gases through the shell (Christensen and Bagley, Poultry Sci., 63, 1350-1356 (1984)). During incubation, an egg must lose a certain amount of its weight, mainly by the loss of water (Peebles et al., Poultry Sci., 66, 834-840 (1987)). The rate of water loss from an egg can influence the rate of embryonic development, pre-pipping oxygen consumption rate, metabolic rate, and gas exchange. The effect of modifications of the egg shell on hatchabililty has been studied, typically by dipping eggs in a solution including sodium hypochlorite (Christensen and Bagley, Poultry Sci., 63, 1350-1356 (1984), (Peebles et al., Poultry Sci., 66, 834-840 (1987), Bagley and Christensen, Poultry Sci., 70, 1412-1418 (1991)). The poultry industry has a continuing need to increase the hatchability of eggs.

SUMMARY OF THE INVENTION

The present invention relates to a significant advance in the art of increasing the hatchability of poultry eggs by providing conditions that can be used to treat eggs. Without intending to be limiting, it is thought that the intense genetic selection for poultry to develop more quickly and have a greater weight has resulted in embryos that have an increased metabolism during incubation, and that the requirements for gas and water vapor exchange during incubation have also changed. However, there has not been a concomitant change in the exchange properties of the egg shell to meet the altered needs of the embryo. Without intending to be limiting, it is believed the invention may increase the hatchability of eggs by modifying the properties of the egg shell to more accurately respond to the needs of the embryo during incubation.

The present invention provides methods including contacting avian eggs with a solution including a halide, and incubating the eggs under conditions to promote hatch of the eggs. The hatchability of the eggs is increased compared to control eggs not contacted with the solution. The incubator may be either single stage or multistage. The solution may be at a temperature of between about 10° C. and about 17° C., the concentration of halide may be between about 1,500 parts per million (ppm) and about 3,700 ppm, the eggs may be in contact with the solution for between about 3 minutes and about 12 minutes, the hatchability of the eggs may be increased at least about 6% compared to the egg not submerged in the solution, and/or the increase in hatchability may be reproducible at a level of at least about 60%. In some aspects, the eggs used are eggs that lose about 11% or less of their initial weight during the incubation process when not subjected to the methods of the present invention, and lose about 12% or greater of their initial weight when subjected to the methods of the present invention. The eggs may be submerged in the solution, and optionally the solution may be agitated while the egg is submerged.

Unless otherwise specified, "a," "an," "the," and "at least one" are used interchangeably and mean one or more than one.

DETAILED DESCRIPTION OF PREFERRED EMBODIMENTS OF THE INVENTION

The present invention provides methods for increasing the likelihood an egg will hatch. The methods of the invention include contacting an avian egg with a solution including a halide. The egg may be contacted with the solution by, for instance, submerging the egg in the solution, or spraying the egg with the solution. Preferably, an egg is submerged in the solution, preferably completely submerged. In some aspects of the invention, the solution is agitated while the egg is submerged. Agitation may occur by, for instance, bubbling air within the solution, or stirring the solution.

The egg used may be a poultry egg, including, for instance, chicken, turkey, goose, or ostrich, or an egg from a game bird (for instance, pheasant, partridge, or quail), preferably, a chicken or turkey egg, most preferably, a turkey egg. The egg may be a commercial egg, obtained from parent stock (also referred to as breeder stock). Commercial eggs are those eggs that yield commercial poults or chicks that are grown and used for meat production. In another aspect, the egg may be one of those used to produce the parent stock. For instance, the egg can be produced by grandparent stock, great grandparent stock, or great great grandparent stock, etc. Typically, the eggs used to produce the parent stock are obtained from a primary breeder, for instance, Nicholas Turkeys (Sonoma, Calif.), British United Turkeys of America (BUTA, Lewisburg, W.Va.), or Hybrid Turkeys (Kitchener, Ontario). In some aspects of the present invention, the eggs are first cycle eggs, i.e., eggs obtained from first cycle (non-molted) hens. In other aspects, the eggs are second cycle eggs, i.e., eggs obtained from second cycle (molted) hens.

The halide present in the solution can be fluorine, chlorine, bromine, iodine, astatine, or a combination thereof, preferably, fluorine, chlorine, bromine, iodine, or a combination thereof, more preferably, fluorine, chlorine, bromine, or a combination thereof, most preferably, chlorine. The concentration of halides in the solution may be, in increasing order of preference, typically at least about 1,500 parts per million (ppm), at least about 1,800 ppm, at least about 2,100 ppm, or at least about 2,400 ppm. The concentration of halides in the solution is, in increasing order of preference, typically no greater than about 3,700 ppm, no greater than about 3,400 ppm, no greater than about 3,200 ppm, or no greater than about 2,800 ppm. Preferably, the halide concentration is the concentration of total halide that is in solution, e.g., the halide present free in solution and complexed with materials, for instance organic materials, present in the solution. Typically, the concentration of the halide in the solution decreases as a function of time the solution is exposed to air, and the number of eggs contacted with the solution. Accordingly, the concentration of the halide in the solution is typically measured immediately before the solution is first used to contact an egg, and also at intervals after the solution has been used to contact an egg. The concentration of halide can be measured using commercially available instruments and routine methods known in the art, including methods and instruments often used for water quality analysis.

The source of the halides in the solution can be nearly any composition containing the appropriate halide or halides. For instance, the source of chlorine can be a composition containing chloride such as solutions containing sodium hypochlorite, including those known by the tradename CLOROX (Clorox Company, Oakland, CA). The concentration of the halide in the source may be measured, and then if necessary the source can be diluted in water for use in the present invention.

The lower range of the temperature of the solution may be, in increasing order of preference, typically at least about 10° C., at least about 11° C., or at least about 12° C. The higher range of the temperature of the solution may be, in increasing order of preference, typically no greater than about 17° C., no greater than about 16° C., or no greater than about 15° C. Generally, the time an egg is contacted with the solution may be at least about 3 minutes, more preferably, at least about 5 minutes, most preferably, at least about 7 minutes. Generally, the time an egg is contacted with the solution may be no greater than about 12 minutes, more preferably, no greater than about 10 minutes, most preferably, no greater than about 8 minutes.

After the egg has been contacted with the solution, it is transferred to an incubator and incubated under conditions that promote the hatching of the egg. Methods for incubating an egg to cause the egg to hatch can vary depending on the type of egg, and such methods are known and routine in the art. The incubator may be a single stage incubator or a multistage incubator. In some aspects, the relative humidity may be controlled. For instance, the humidity level can be maintained in a multistage incubator at between about 51% and about 55%, preferably, about 53%, and the humidity level in a single stage can be maintained at a level that begins at between about 56% and about 60%, preferably about 58%, and gradually decreases to between about 45% and about 54%, preferably, between about 47% and about 52%.

In some aspects of the invention, the methods of the present invention are used when eggs not contacted with the solution disclosed herein typically lose about 11% or less of the initial weight during the incubation process. The weight loss can be determined by weighing eggs before they are placed in an incubator, typically immediately before placement in the incubator, and then measuring the weight of the eggs at the end of the incubation period, after transfer of the eggs from the incubator to a hatcher and before they hatch. The amount of weight lost during incubation can be influenced by, for instance, the humidity level in the incubator, the characteristics of the egg and/or egg shell, the age of the hen laying the egg, or a combination thereof. Without intending to be limiting, the present methods may increase hatchability and hatch of fertile by increasing the amount of weight lost by an egg during the incubation process. For instance, using the methods of the present invention, the amount of weight lost by an egg during the incubation process may be increased to about 12%, about 13%, about 14%, to about 15%, or to about 16%.

It is further expected that it will be possible to use characteristics of an egg to predict whether the egg's ability to hatch can be increased using the methods described herein. Such characteristics include those that influence the rate of transport of a gas across an egg shell, such as egg shell permeability, surface area of the egg shell, and the gas tension difference across the shell (Wangensteen and Rahn, Respiration Physiol., 11, 31-45 (1970/71)).

An increase in the likelihood an egg will hatch can be measured by calculating the "hatchability" or the "hatch of fertile" of a number of eggs. The term "hatchability" as used herein refers to the percentage of total eggs that hatch a viable chick or poult (e.g., number of poults hatched per number of eggs set×100). The term "hatch of fertile" as used herein refers to the percentage of total fertile eggs that hatch a viable chick or poult (e.g., number of poults hatched per number of fertile eggs set×100). Whether the likelihood an egg will hatch is increased can be determined by contacting a number of eggs (for instance, about 100 eggs) with a solution including a halide, for instance chlorine, and incubating the eggs under conditions that promote hatching. The hatchability and/or the hatch of fertile of the treated eggs can be compared to the hatchability and/or hatch of fertile of eggs treated in an identical manner but not contacted with the solution containing a halide. Typically, the eggs contacted with the solution containing a halide have an increase in hatchability that is at least about single unit percentages greater than 3%, for example, at least about 4%, at least about 5%, at least about 6%, and so on to at least about 19% greater than the hatchability of the eggs not contacted with the solution. Alternatively, the eggs contacted with the solution containing chlorine typically have an increase in hatch of fertile that is at least about single unit percentages greater than 3%, for example, at least about 4%, at least about 5%, at least about 6%, and so on to at least about 19% greater than the hatch of fertile of the eggs not contacted with the solution. In general, the lower the weight lost by eggs in the absence of treatment with the methods described herein, the greater the increase in hatchability and/or hatch of fertile in the eggs after treatment. When determining if treatment of eggs results in an increase in hatchability or hatch of fertile, the two groups of eggs that are compared, i.e., the treated eggs and those eggs not contacted with the solution, are the same type of egg. For instance, the two groups of eggs are from the same pedigree and the same parent flock.

The increase in hatchability that results from using the methods described herein is typically reproducible at a level of at least about 60%, at least about 70%, at least about 80%, at least about 85%, at least about 90%, at least about 95%, or at least about 97%. As used herein, the phrase "reproducible at a level" refers to the reproducibility of the method. For instance, "reproducible at a level of at least about 60%" means that when the method is practiced multiple times, there is an increase in hatchability and/or hatchability of fertile at least about 60% of the time.

The present invention is illustrated by the following examples. It is to be understood that the particular examples, materials, amounts, and procedures are to be interpreted broadly in accordance with the scope and spirit of the invention as set forth herein.

EXAMPLES

Example 1

Experimental Design

The dipping solution contained chlorine, and was made by combining bleach (Clorox Company, Oakland, Calif.) or sodium hypochlorite (Hawkins Chemical, Inc. St. Paul, Minn.) with water. The chlorine concentration in stock bleach or sodium hypochlorite solutions was determined using the Hypochlorite (Bleach) Test Kit (HACH Company, Loveland, Colo., Cat. No. 26871-00). Chlorine concentration in the dipping solution was determined using the Chlorine Test Kit (HACH Company, Cat. No. 24711-00). The amount of bleach needed to make a desirable hypochlorite concentration in dipping solution was calculated, and added to the appropriate volume of tap water to result in 90 or 100 gallons of dipping solution. The solution was mixed and one half of the volume was transferred to another tank. When dip tanks were used, the amount of bleach needed to make a desirable concentration of hypochlorite was calculated and added to the appropriate amount of water to result in 200 and 400 gallons of dipping solution.

The eggs were stored in a hatchery cooler at about 14° C. When eggs were dipped in 100-gallon plastic tubs, immediately prior to dipping the eggs were placed in plastic egg flats holding 30 eggs each, and the flats were placed in groups of four, stacked on top of each other to yield 120 eggs per stack. The stacks were randomly divided into three groups of 120 eggs each; two test groups, and one control group that was not dipped. At other times, the eggs were randomly divided into two groups of 120 eggs each; one test group, and one control group that was not dipped. When eggs were dipped using metal dip tanks, immediately prior to dipping, eggs were placed in plastic egg flats holding 25 eggs each, and eight flats were placed in each egg case to yield 200 eggs per case. Four egg cases with eggs were placed in the 200-gallon dip tank and eight egg cases were placed in the 400-gallon dip tank.

The eggs were dipped using 100-gallon plastic tanks filled with 45 or 50 gallons dipping solution or commercial dip tanks that contained 200 and 400 gallons of dipping solution. When 100-gallon plastic tubs were used, three stacks of eggs (120 eggs per stack) were dipped at the same time. When 200-gallon and 400-gallon dip tanks were used, four or eight cases were dipped at the same time. The stacks with eggs or egg cases were placed on the bottom of the tank with dipping solution for specified period of time (the exposure time). All eggs were completely immersed in dipping solution for the full exposure time. During dipping, the dipping solution was agitated by bubbling air from the bottom or the side of the tank. When 100-gallon plastic tubs were used, a perforated plastic tube was placed on the bottom of the tank, on one side of the stacks with eggs, and air was passed through it. After one half of the exposure period had elapsed, the tube was moved to the other side of the stacks. When metal tanks were used, agitation was provided using perforated tubes that were attached to the side of the tank. The temperature of the dipping solution was about 12° C. to about 15° C.

Samples of dipping solution were obtained immediately before dipping and used to measure chlorine concentration. To measure chlorine loss during dipping, the samples were obtained immediately before the first dipping and immediately after the fourth dipping.

During dipping, there was some loss of gaseous chlorine from the dipping solution. To avoid larger variations in chlorine concentration, a new solution was used after every 4 batches of eggs (e.g., after 1,440 eggs) had been dipped when 100-gallon plastic tubs were used or after 2 batches of eggs (e.g., after 1,600 or 3,200 eggs) were dipped when dip tanks were used. Under these conditions, the difference in chlorine concentration between the first and the fourth batch of eggs dipped in the same solution was less than 200 parts per million (ppm).

After dipping, the eggs were left at room temperature to dry. The eggs were placed in a setting rack, and then moved to an egg cooler (about 12° C. to about 14° C.) where they were kept until the following day, when they were set in incubators.

Single stage or multistage incubators were used. When multistage incubators were used, each incubation rack contained 4,320 eggs, and enough groups of eggs were tested to fill an incubation rack. Thus, in the experiments with three groups of eggs (i.e., 2 test groups and 1 control group), each group contained 1,440 eggs. When two groups were tested (i.e., 1 test group and 1 control group), each contained 2,160 eggs. All experimental eggs in each incubation rack were from the same breeder flock. Flats containing eggs from test groups and flats containing eggs from control groups were paired (or placed in groups of three, in the situations when there were 2 test and 1 control group) and evenly distributed within the incubator. When single stage incubators were used, each incubation rack contained 12,000 eggs. As experimental groups were smaller (4,800 eggs with half of them being non-dipped controls), regular non-dipped eggs were used to fill an incubation rack.

During transfer from egg flats into the hatching trays, care was taken to make sure that the test(s) and the corresponding control group of eggs that were placed next to each other in the incubator were placed next to each other in the hatcher. This was done to minimize any possible effect of uneven incubation and hatching conditions due to differences in location in the incubator and hatcher and equalize for any such differences.

The numbers of poults hatched, tray poults (i.e., those poults that had hatched but were not used because of some abnormality), and unhatched eggs were determined for each group. Breakout of unhatched eggs (i.e., examination of the contents of unhatched eggs) was done to evaluate the effect of egg source, egg handling, and incubation and hatching conditions. Hatchability (number of poults hatched per number of eggs set×100) and hatch of fertile (number of poults hatched per number of fertile eggs×100) were calculated for each group using standard industry methods. Also, corrected hatchability and corrected hatch of fertile were calculated for each group. In this case, the number of eggs set was corrected for cracked eggs, transfer cracks, and contaminated eggs (rots). Comparison of treated and non-treated (control) groups was based on the percentage of times hatchability and hatch of fertile of treated group were better than those in non-treated control. It was assumed that if the treatment produced no improvement, hatchability and hatch of fertile would be better in the treated group no more than 50% of the time.

Example 2

Commercial eggs from Nicholas or Hybrid turkey parent stocks were used. The dipping solution contained chlorine at a concentration of 2,400 ppm to 2,700 ppm. The eggs were dipped for 8 to 10 minutes, and there were no more than 8.5 eggs per liter of dipping solution. After dipping, the eggs were incubated in a multistage incubator having a relative humidity level of about 53%. The incubation of eggs that were not contacted with the solution resulted in a weight decrease of about 10% to about 11%.

Results

About 80,000 eggs were tested under these conditions, including about 50,000 eggs that were treated and about 30,000 eggs that were used as controls. The average hatchability for all treated eggs was 84%, and the average hatchability for all non-treated eggs was 76%. Thus the average increase in hatchability was 8%. The average hatch of fertile for all treated eggs was 91%, and the average hatch of fertile for all non-treated eggs was 85%. Thus the average increase in hatch of fertile was 6%. This procedure resulted in an increase in hatchability of treated eggs about 95% of the time it was used. The remaining 5% of the time, treating the eggs had no effect on hatchability.

Example 3

Conditions identical to those described in Example 2 were used, with the exception that the eggs were from grandparent stocks, both male and female lines, and the dipping solution contained chlorine at a concentration of between 2,400 ppm and 2,800 ppm. After dipping, the eggs were incubated in a single stage incubator having a humidity level of about 58% at the beginning of the incubation and gradually decreasing to between 47% and 52% by the end of the incubation period. The incubation of eggs that were not contacted with the solution resulted in a weight decrease of about 10% to about 11%.

Results

About 32,000 eggs were tested under these conditions, including about 24,000 eggs that were treated and about 8,000 eggs that were used as controls. The average hatchability for all treated eggs was 79%, and the average hatchability for all non-treated eggs was about 65%. Thus the average increase in hatchability was 14%. The average hatch of fertile for all treated eggs was 89%, and the average hatch of fertile for all non-treated eggs was 72%. Thus the average increase in hatch of fertile was 17%. This procedure resulted in an increase in hatchability of treated eggs about 95% of the time it was used. The remaining 5% of the time, treating the eggs had no effect on hatchability.

Example 4

Conditions identical to those described in Example 2 were used, with the exception that the eggs were commercial eggs produced by Nicholas turkey parent stock. After dipping, the eggs were incubated in a single stage incubator having a humidity level of about 58% at the beginning of the incubation and gradually decreasing to between 48% and 52% by the end of the incubation period. The single stage incubator used was not the same incubator used in Example 3. The incubation of eggs that were not contacted with the solution resulted in a weight decrease of about 13% to about 14%.

Results

About 95,040 eggs were tested under these conditions, including about 47,520 eggs that were treated and about 47,520 eggs that were used as controls. The average hatch of fertile for treated eggs was 93%, and the average hatch of fertile for non-treated eggs was about 92%.

Example 5

Commercial eggs produced by Nicholas turkey parent stock that had molted were used. Eggs were randomized and separated into 4 groups. Each of the groups was then separated into 2 groups: test and control. Test eggs were dipped, and the corresponding controls were not. Before dipping, eggs were placed in egg flats, 25 eggs per flat, and 8 flats were placed in each egg case to yield 200 eggs per case. Each test and control group contained 6 cases (1,200 eggs). Eggs were dipped in a dip tank that contained around 400 gallons of dipping solution having a chlorine concentration of approximately 3,400 ppm. The 4 groups were dipped for either 5, 7, 9, or 11 minutes. After dipping, the eggs were incubated in a single stage incubator having a humidity level of about 58% at the beginning of the incubation and gradually decreasing to between 48% and 52% by the end of the incubation period.

Results

About 21,600 eggs were tested under these conditions, including 10,800 treated eggs and 10,800 eggs that were used as controls. The eggs dipped for 5 minutes had an average increase in hatch of fertile of 1.80%, while the eggs dipped for 7, 9, or 11 minutes did not exhibit any increase in hatch of fertile.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

All headings are for the convenience of the reader and should not be used to limit the meaning of the text that follows the heading, unless so specified.

What is claimed is:

1. A method comprising:
   contacting avian eggs prior to setting with a solution at a temperature between about 10° C. and about 17° C., wherein the solution comprises a halide, wherein the concentration of halide is between about 1,500 parts per million (ppm) and about 3,700 ppm, and wherein the eggs are in contact with the solution for between about 3 minutes and about 12 minutes; and
   incubating the eggs under conditions to promote hatch of the eggs, wherein hatchability of the eggs is increased at least about 6% compared to control eggs not contacted with the solution, wherein hatchability is the percentage of total eggs that hatch a viable chick or poult, and wherein the increase in hatchability is reproducible at a level of at least about 60%.

2. The method of claim 1 wherein the halide is chloride.

3. The method of claim 1 wherein the halide is obtained from a composition comprising sodium hypochlorite.

4. A method comprising:
   contacting avian eggs with a solution comprising chlorine, wherein the solution is between about 10° C. and about 17° C., wherein the concentration of chlorine is between about 1,500 parts per million (ppm) and about 3,400 ppm, and wherein the eggs are in contact with the solution for between about 3 minutes and about 12 minutes; and
   incubating the eggs under conditions to promote hatch of the eggs, wherein hatchability of the eggs is increased at least about 6% compared to control eggs not contacted with the solution, wherein hatchability is the percentage of total eggs that hatch a viable chick or poult, and wherein the increase in hatchability is reproducible at a level of at least about 60%.

5. The method of claim 4 wherein the chlorine is obtained from a composition comprising a hypochlorite.

6. A method comprising:
   contacting avian eggs with a solution comprising chlorine, wherein the solution is between about 10° C. and about 17° C., wherein the concentration of chlorine is between about 1,500 ppm and about 3,700 ppm, and wherein the eggs are in contact with the solution for between about 3 minutes and about 9 minutes; and
   incubating the eggs under conditions to promote hatch of the eggs, wherein hatchability of the eggs is increased at least about 6% compared to control eggs not contacted with the solution, wherein hatchability is the percentage of total eggs that hatch a viable chick or poult, and wherein the increase in hatchability is reproducible at a level of at least about 60%.

7. The method of claim 6 wherein the chlorine is obtained from a composition comprising a hypochlorite.

8. A method comprising:
contacting avian eggs with a solution comprising a halide, wherein the solution is between about 10° C. and about 17° C., wherein the concentration of halide is between about 1,500 ppm and about 3,400 ppm, and wherein the eggs are in contact with the solution for between about 3 minutes and about 12 minutes; and
incubating the eggs under conditions to promote hatch of the eggs, wherein hatchability of the eggs is increased at least about 6% compared to control eggs not contacted with the solution, wherein hatchability is the percentage of total eggs that hatch a viable chick or poult, and wherein the increase in hatchability is reproducible at a level of at least about 60%.

9. The method of claim 8 wherein the halide is chloride.

10. The method of claim 8 wherein the halide is obtained from a composition comprising sodium hypochlorite.

11. A method comprising:
contacting avian eggs with a solution comprising a halide, wherein the solution is between about 10° C. and about 17° C., wherein the concentration of halide is between about 1,500 ppm and about 3,700 ppm, and wherein the eggs are in contact with the solution for between about 3 minutes and about 9 minutes; and
incubating the eggs under conditions to promote hatch of the eggs, wherein hatchability of the eggs is increased at least about 6% compared to control eggs not contacted with the solution, wherein hatchability is the percentage of total eggs that hatch a viable, chick or poult, and wherein the increase in hatchability is reproducible at a level of at least about 60%.

12. The method of claim 11 wherein the halide is chloride.

13. The method of claim 11 wherein the halide is obtained from a composition comprising sodium hypochlorite.

14. A method comprising:
contacting avian eggs prior to setting with a solution at a temperature between about 10° C. and about 17° C., wherein the solution comprises chlorine, wherein the concentration of chlorine is between about 1,500 parts per million and about 3,700 ppm, and wherein the eggs are in contact with the solution for between about 3 minutes and about 12 minutes; and
incubating the eggs under conditions to promote hatch of the eggs, wherein hatchability of the eggs is increased at least about 6% compared to control eggs not contacted with the solution, wherein hatchability is the percentage of total eggs that hatch a viable chick or poult, and wherein the increase in hatchability is reproducible at a level of at least about 60%.

15. The method of claim 14 wherein the chlorine is obtained from a composition comprising a hypochiorite.

* * * * *

UNITED STATES PATENT AND TRADEMARK OFFICE
CERTIFICATE OF CORRECTION

PATENT NO. : 7,404,375 B2  Page 1 of 1
APPLICATION NO. : 10/865186
DATED : July 29, 2008
INVENTOR(S) : Rajcic-Spasojevic et al.

It is certified that error appears in the above-identified patent and that said Letters Patent is hereby corrected as shown below:

In column 3, Lines 11 and 12, please delete "hypochiorite" and replace with --hypochlorite--.

In column 8, Line 38, claim 3, please delete "hypochiorite" and replace with --hypochlorite--.

In column 9, Line 22, claim 10, please delete "hypochiorite" and replace with --hypochlorite--.

In column 10, Line 27, claim 15, please delete "hypochiorite" and replace with --hypochlorite--.

Signed and Sealed this

Seventh Day of October, 2008

JON W. DUDAS
*Director of the United States Patent and Trademark Office*